United States Patent [19]

Bauer et al.

[11] 4,267,912
[45] May 19, 1981

[54] SYNCHRONIZING RING

[75] Inventors: Walter Bauer, Eppelheim; Emilio Fabricius, Heidelberg; Günther Lanzerath, Wieblingen; Helmut Patzer, Nussloch; Richard Vögele, Aultussheim, all of Fed. Rep. of Germany

[73] Assignee: Borg-Warner-Stieber GmbH, Heidelberg, Fed. Rep. of Germany

[21] Appl. No.: 948,286

[22] Filed: Oct. 3, 1978
(Under 37 CFR 1.47)

[30] Foreign Application Priority Data
Oct. 6, 1977 [DE] Fed. Rep. of Germany ....... 2744994

[51] Int. Cl.³ .................... F16D 23/06; F16D 13/66
[52] U.S. Cl. ................................ 192/53 F; 29/469.5; 192/107 M
[58] Field of Search .................. 192/53 F, 107 M; 29/469.5

[56] References Cited

U.S. PATENT DOCUMENTS

| 2,322,970 | 6/1943 | Robbins | 192/53 F |
| 2,745,529 | 5/1956 | Dorpmund | 192/53 F |
| 2,864,476 | 12/1958 | Ashauer et al. | 192/53 F |
| 3,270,846 | 9/1966 | Arledter et al. | 192/107 M |
| 3,390,750 | 7/1968 | Albertson | 192/107 M |
| 3,554,860 | 1/1971 | LaCroix, Jr. | 192/107 M X |
| 3,741,358 | 6/1973 | Magnier | 192/53 F |
| 3,850,791 | 11/1974 | Guittard | 192/107 M X |

FOREIGN PATENT DOCUMENTS

| 1500332 | 8/1965 | Fed. Rep. of Germany . | |
| 1550672 | 4/1966 | Fed. Rep. of Germany . | |
| 2055345 | 11/1970 | Fed. Rep. of Germany . | |
| 1535343 | 6/1968 | France . | |
| 42-24053 | 7/1967 | Japan | 192/53 F |

Primary Examiner—Allan D. Herrmann
Attorney, Agent, or Firm—James A. Geppert

[57] ABSTRACT

A synchronizing ring (1) adapted for use in a gear clutch where the ring includes an annular body (2) formed of a chip-free material, such as a metallic body of forged or sintered material or a plastic, and having a generally conical friction surface (6) with a fibrous friction lining (3) cemented thereto. The ring has one or more generally axially extending grooves (5) formed in the friction material to provide for draining of oil during operation of the ring.

14 Claims, 6 Drawing Figures

SYNCHRONIZING RING

BACKGROUND OF THE INVENTION

It is conventional practice in gear couplings having gear synchronization to achieve synchronization of the shaft and gear to be coupled by the use of synchronizing rings which are axially shifted through a gearshift sleeve. The synchronizing rings are provided with internal or external conical friction surfaces which engage corresponding conical surfaces of the shaft or gear with the resulting frictional engagement establishing the desired synchronization of the parts involved. Such an assembly is shown in the German Pat. No. 1,500,332.

Also, gear clutches are known wherein the synchronizing rings have both internal and external friction surfaces, as shown in German Pat. No. 1,550,172. These synchronizing rings are provided for the locking synchronization of transmission change gears, especially in automotive vehicles.

In general, synchronizing rings are formed of materials having properties which are designed for the demands placed on the synchronizing rings. One frequently used material is a brass alloy which, having the requisite surface tooling on the friction surface, provides the coefficient of friction required for effective frictional engagement as well as the strength required for the gearing. However, these alloys have the disadvantage of being expensive and are limited in their performance capacity. Also, the alloys are difficult to work with in the manufacture of the rings and entail considerable expense.

Synchronizer rings of ferrous metal, especially sintered metal, are simple to manufacture and have the advantage of lower tooling costs. However, the sintered material does not have a good coefficient of friction due to the absorption of oil present in the gear by the material. For this reason, special alloys of sintered material have been tried to obtain better coefficients of friction, however, these alloys like the special brass alloys are also expensive.

To provide improved synchronizing rings, ring bodies have been produced from sintered metal with the friction surface for the ring provided by spraying a layer of molybdenum on the ring, such as described in German Patent Specification OS No. 2,055,345. Radially running transverse grooves were machined into the molybdenum friction surface to allow for the flow of oil from the ring. Although the synchronizing rings produced by this process had friction surfaces with high coefficients of friction, the rings did not exhibit the desired frictional characteristics or have the desired life. Furthermore, the manufacturing costs associated with this process are extremely high such that the synchronizing rings were very expensive.

In order to avoid imperfections in the molybdenum layer, it was proposed in German Specification OS No. 2,055,345 to make the annular body with trough shaped depressions and then to apply the molybdenum layer in such a way that local weaknesses are not present in the layer. The molybdenum layer is applied to have a constant thickness in the depressions as well as on the remainder of the friction surface. However, the manufacturing technology of this process is extremely expensive.

Synchronizing rings with a molybdenum friction layer have the disadvantages of insufficient strength in the frictional engagement during synchronization to provide the shifting operation with a low shifting force at high gear performances and of a relatively short life of the synchronizing ring or its molybdenum layer. To avoid these disadvantages, it was proposed to enrich the molybdenum layer with oxygen to increase the frictional effect. This addition, of course, further increases the manufacturing costs.

Therefore, it is evident from the above proposals that to fulfill the requirements for present gear shift arrangements, the synchronizing rings can only be produced by means of relatively expensive manufacturing processes. Other forms of synchronizing rings have the disadvantage of a short useful life or that the frictional characteristics and coefficient of friction will decrease with increasing age. Decrease in the frictional properties leads to poor synchronizing effectiveness which is associated with considerable shifting noises.

SUMMARY OF THE INVENTION

The present invention is designed to overcome the above problems by producing a synchronizing ring in a simple manner to provide frictional characteristics that will assure a long life and good switching capacity.

The present invention achieves the above objectives by providing a chiplessly manufactured synchronizing ring formed of sintered metal with a lining of an organic based friction material, the friction lining being joined with the pre-finished annular body by adhesion and having a coefficient of friction ($\mu$) of more than 0.10. An annular body made in any desired manner, such as a forged part, a pressure-casting part or a stamped part, can be utilized in this process wherein the friction lining is cemented to the part. The part is formed without machining, i.e., chipless manufacture, with the metal annular body having special advantages due to its lasting properties. In the synchronizing ring, the problems to be overcome are separated; namely, the annular body consists of a high strength material for the blocking gearing, while the special friction layer yields the desirable frictional characteristics.

The friction lining for the synchronizing rings is preferably a paper base material; the paper consisting of cellulose fibers and/or synthetic fibers, including cotton fibers, asbestos fibers and/or mineral and metal fibers and fillers. The fibers are saturated with a synthetic resin and present a rough and porous surface; the impregnated material having a thickness of 0.2 to 1.2 mm., preferably 0.4 to 0.8 mm. For a better heat stability, a corresponding quality paper is provided with asbestos fibers or other similar inorganic fibers and is impregnated with a synthetic resin to the prescribed thickness. If desired, suitable chemical additives can be added to the impregnating agent. The composition of the paper friction material and the impregnating agent as well as the process steps in the impregnation of the paper and the subsequent cementing of the friction material to the ring are determinative of the frictional characteristics of the friction lining. A special advantage of the present invention resides in the possibility of influencing the frictional characteristics within wide limits.

A particularly favorable result is obtained if the friction lining utilized is porous and elastic. The porosity of the friction lining results in absorption of the otherwise troublesome oil film that is present on the friction surfaces and, moreover, acts to strip the oil film away from the friction surfaces during operation of the synchronizer ring. Thus, there will be no wearing of the friction surface by abrasion. The friction surfaces act like a sponge in the absorption and the squeezing out of the oil; the oil that is squeezed out also having a cooling effect on the coating.

Furthermore, it is desirable to provide the friction layer of the ring with axially extending grooves that serve to drain the oil away; the groove edges acting to strip the oil from the friction surfaces. For this reason, the grooves are formed as sharp edged as possible. If the friction lining is formed of a series of segments, the adjacent ends of the segments of friction lining can be spaced from one another to provide grooves in addition to or replacing the above mentioned grooves to form oil drain grooves. The depth of the grooves is selected so as to provide a sufficient run-off of oil from the ring. On the other hand, the groove depth is attuned to the thickness of the friction lining. In the case of a friction lining having a thickness of 0.2 to 1.2 mm., the depth of the grooves is preferably 0.1 to 0.6 mm. Also, other forms or alignment of grooves in the ring is contemplated, especially in a peripheral direction on the synchronizing ring.

The special advantage of the proposed synchronizing ring resides in its high coefficient of friction and in its elasticity, which is achieved through the friction lining. The friction lining results in an elastic engagement of the blocking members and thereby leads to a gentle shifting operation.

A particularly effective embodiment of the present invention having the requisite frictional requirements is achieved if the annular body is provided with depressions in the friction surface for the reception of friction lining material. In this embodiment, the annular body is provided with a number of depressions corresponding to the number of grooves for the draining of oil and, in the production of the oil drain grooves, the excess friction lining material is pressed into the depressions of the annular body. An especially sharp-edged formation of the grooves can be achieved by milling of the grooves, among other methods.

In further development of the invention, the synchronizing ring is formed from an annular body produced by casting or sintering of a suitable metal, and the friction lining is cemented to the annular body; wherein during cementing, a calibration of the friction surface takes place. The formation of the annular body and of the friction lining take place separately from one another, and only for the cementing process are the annular body and the friction lining brought into engagement with one another to achieve the final functioning form. A suitable adhesive is used for the cementing step. It is also possible to provide the friction lining with an impregnating agent having adhesive properties that would be activated during the cementing process.

The cementing process is preferably carried out with the use of heat and pressure. The pressures to be applied are in the range of 400 to 1000 N/cm$^2$, with a preferred range of 600 to 640 N/cm$^2$, and at temperatures in the range of 180° to 250° C., preferably 200° to 230° C., and with a duration of the process of 10 to 60 seconds, preferably 20 to 30 seconds. The impregnating agent used is subjected to a final hardening at this time.

The production of the annular body to form the ring can take place in various ways, such as by sintering, forging, stamping and also in the pressure-casting or compression-casting process.

For many uses, it is sufficient if the friction lining is applied to the annular body in such a way that the ends of the lining material are spaced from one another to form a groove. From this groove, the oil can be led off from the shaft cone. However, it is preferable that the friction lining be provided at predetermined spacings with axially extending grooves therein in order to achieve a good oil run-off. These grooves may be formed by a relatively strong compression of the friction lining at the corresponding locations during the calibrating process. It is especially desirable, however, to provide the formed annular body with axially extending depressions so that corresponding parts of the friction lining are pressed into the depressions in the annular body during the cementing and/or calibrating process. In this manner, not only are grooves having a certain depth achieved, but also a close juncture between the friction lining and the annular body is accomplished, which provides a bonding of the frictional lining with the annular body in addition to the cementing operation.

DESCRIPTION OF THE DRAWINGS

With the aid of several embodiments represented in the drawings, the invention is explained below.

DESCRIPTION OF THE PREFERRED EMBODIMENTS

Figure 1:
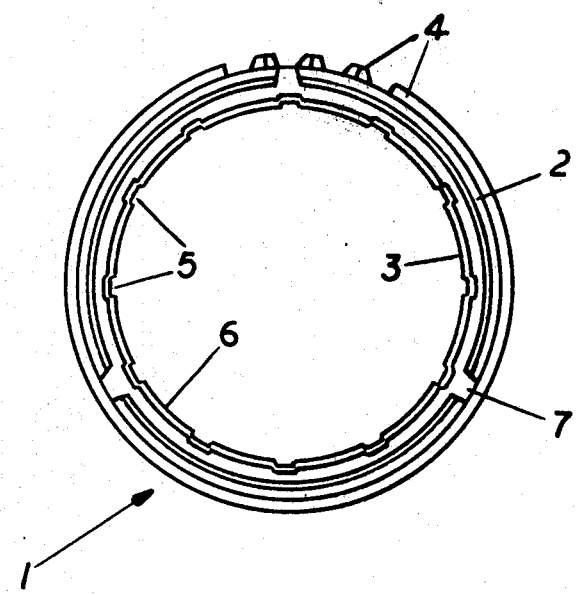
FIG. 1 is a front elevational view of a synchronizing ring of the present invention.
Figure 2:
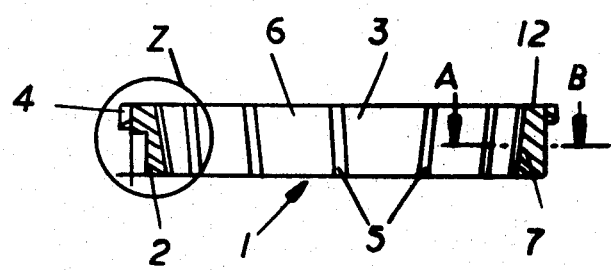
FIG. 2 is a cross sectional view through the synchronizing ring of FIG. 1.

The synchronizing ring 1 shown in FIGS. 1 and 2 consists essentially of an annular body 2 formed of a suitable metal or plastic and a friction lining 3. The annular body 2 is provided at one edge 12 of its circumference with a toothed construction 4, which in FIG. 1 has been drawn only on the upper portion of the annular body in the interest of simplicity. In the present instance, the friction lining 3 is applied to the conically formed interior surface 6 of the annular body 2. In other embodiments, the friction lining can also be applied to the exterior surface of the annular body. Distributed on the interior surface 6 of the synchronizing ring 1 are grooves 5 formed of equal size and having predetermined uniform spacing around the ring and extending in an axial direction, which grooves serve for oil draining during the shifting operation. Three lugs 7 are arranged spaced at 120° intervals on the ring to serve for the blocking of the synchronizing ring.

Figure 3:
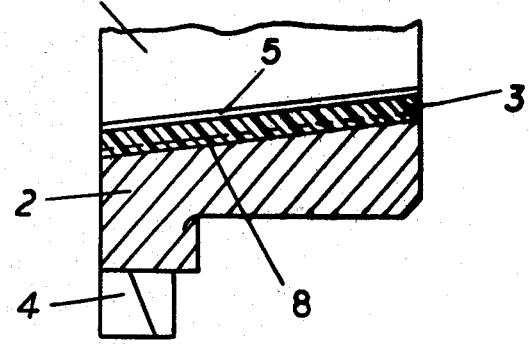
FIG. 3 is an enlarged portion of the synchronizing ring as shown in detail Z.

In the enlarged section through a portion of the synchronizing ring 1 shown in FIG. 3, the position of the groove 5 is more clearly evident. The friction lining 3 is cemented to the annular body 2, and depressions 8 are formed in the annular body 2 corresponding to and into which the bulges lying opposite the friction lining grooves 5 are pressed.

Figure 4:
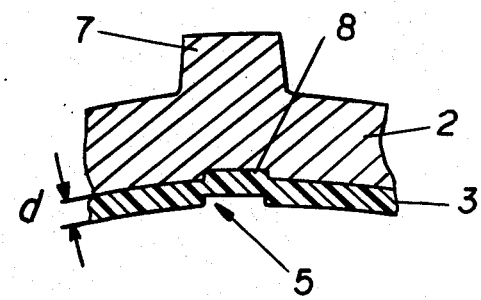
FIG. 4 is a partial cross sectional view of a part of the synchronizing ring taken on the line A–B of FIG. 2.

In FIG. 4, a groove 5 is shown in cross section. The annular body 2 is provided with the depressions 8 which correspond in their position and formation with the oil stripping grooves 5 of the friction lining 3. The friction lining has a thickness of d=0.8 mm., and it is porous (ca. 30 to 50%) so that it can absorb or give up oil, depending on the pressure acting on it. The groove 5 is formed with sharp edges to achieve an effective stripping of the oil.

Figure 5:
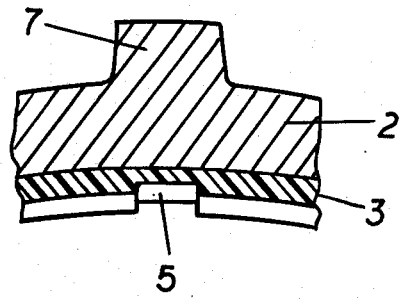
FIGS. 5 and 6 are cross sectional views through synchronizing rings showing alternate forms of the friction coating.
Figure 6:
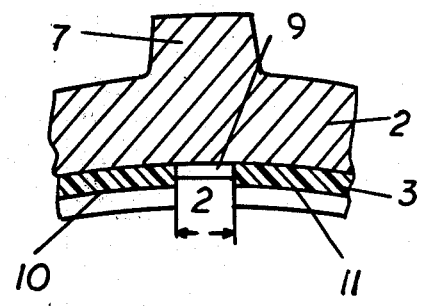

In FIGS. 5 and 6 there are shown cross sections of two alternate embodiments of a grooved place on the synchronizing ring 1 corresponding to the sectional view shown in FIG. 4. In each embodiment, however, the annular body 2 is formed without depressions 8, and the grooves 5 are achieved merely by the corresponding formation of the friction lining in the locations concerned. Thus, in FIG. 5, the friction lining 3 is cemented to the smooth conical interior surface of the annular body 2 and provided with oil stripping grooves 5 formed therein. The synchronizing ring 1 according to FIG. 6, however, has only one oil stripping groove 9 on the entire inside circumference of the friction lining 3, which groove is formed due to the ends 10 and 11 of the applied friction lining 3 being spaced from one another.

We claim:

1. A synchronizing ring adapted for gear synchronization in gear couplings, comprising an annular body of a suitable material and having a conical clutching surface, and a friction lining formed of organic materials joined to the clutch surface of the body by cementing, depressions formed in the annular body for the reception of said friction lining material, the friction lining having a coefficient of friction of more than 0.10.

2. A synchronizing ring according to claim 1, wherein the friction lining is produced from a paper base consisting of cellulose fibers and/or synthetic fibers, with cotton fibers, asbestos fibers and/or mineral and metal fibers and fillers, the paper being saturated with a synthetic resin to present a rough and porous surface.

3. A synchronizing ring according to claim 1 or 2, wherein the friction lining has a thickness of 0.2 to 1.2 mm., preferably 0.4 to 0.8 mm.

4. A synchronizing ring according to claims 1 or 2, wherein the friction lining is porous and elastic.

5. A synchronizing ring according to claims 1 or 2, in which the friction lining is formed with axially aligned grooves for the stripping of oil.

6. A synchronizing ring according to claims 1 or 2, in which the peripheral ends of the friction lining facing one another on the annular body are spaced apart to form a groove for the draining of oil.

7. A process for the manufacture of a synchronizing ring having an annular body of a suitable material with a conical clutching surface and a friction lining of organic materials joined thereto, including the steps of casting or sintering the annular body, cementing the friction lining to the annular body, and calibrating the friction surface during cementing thereof.

8. The process according to claim 7, wherein the friction lining is provided in predetermined locations with axially extending grooves.

9. The process according to claim 8, wherein the grooves are formed by stronger compression of the friction lining in the predetermined locations.

10. A process for the manufacture of a synchronizing ring having an annular body of a suitable material with a conical clutching surface and a friction lining of organic materials joined thereto, including the steps of casting or sintering the annular body, cementing the friction lining to the annular body with the application of heat and pressure, the pressures being in the range of 400 to 1000 N/cm² and the temperature in the range of 180° to 250° C. over a time period of 10 to 60 seconds, and calibrating the friction surface during cementing thereof.

11. The process according to claim 10, wherein the annular body is produced by forging or stamping.

12. The process according to claim 10, wherein the annular body is produced by pressure casting.

13. A process for the manufacture of a synchronizing ring having an annular body of a suitable material with a conical clutching surface and a friction lining of organic materials joined thereto, including the steps of casting or sintering the annular body, cementing the friction lining to the annular body, the cementing operation being carried out under a pressure in the range of 600 to 650 N/cm² and a temperature in the range of 200° to 230° C. over a time period of 20 to 30 seconds, and calibrating the friction surface during cementing thereof.

14. A process for the manufacture of a synchronizing ring having an annular body of a suitable material with a conical clutching surface and a friction lining of organic materials joined thereto, including the steps of casting or sintering the annular body, providing axially extending depressions at predetermined locations in the annular body, cementing the friction lining to the annular body and calibrating the friction surface during cementing thereof, and pressing corresponding portions of the friction lining into the depressions during the cementing and/or calibrating process to provide corresponding axially extending grooves in the friction lining.

* * * * *